United States Patent
Eisen et al.

(10) Patent No.: US 6,235,799 B1
(45) Date of Patent: May 22, 2001

(54) METHOD FOR PRODUCING SOFT TO MEDIUM-HARD STRUCTURAL POLYURETHANE FOAMS

(75) Inventors: Norbert Eisen, Köln; Geza Avar, Leverkusen; Peter Haas, Haan, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/424,050

(22) PCT Filed: May 8, 1998

(86) PCT No.: PCT/EP98/02705

§ 371 Date: Nov. 17, 1999

§ 102(e) Date: Nov. 17, 1999

(87) PCT Pub. No.: WO98/52998

PCT Pub. Date: Nov. 26, 1998

(30) Foreign Application Priority Data

May 21, 1997 (DE) ............................................... 197 21 220

(51) Int. Cl.[7] ...................................................... C08J 9/34
(52) U.S. Cl. ........................... 521/51; 521/131; 521/137; 521/155; 521/159; 521/170; 521/174
(58) Field of Search .............................. 521/51, 131, 137, 521/155, 159, 170, 174

(56) References Cited

U.S. PATENT DOCUMENTS

| | | |
|---|---|---|
| 3,178,490 | 4/1965 | Petrino et al. . |
| 3,182,104 | 5/1965 | Cwik . |
| 3,931,106 | 1/1976 | Crosby et al. . |
| 4,065,410 | 12/1977 | Schäfer et al. . |
| 4,218,543 | 8/1980 | Weber et al. ........................... 521/51 |
| 4,623,672 | 11/1986 | Kleinstück et al. ................. 521/108 |
| 5,444,101 * | 8/1995 | De Vos et al. ....................... 521/131 |
| 5,585,409 * | 12/1996 | Volkert et al. .......................... 521/51 |
| 5,614,565 * | 3/1997 | Werner et al. ....................... 521/137 |
| 5,624,966 * | 4/1997 | Narayan et al. ....................... 521/51 |
| 5,731,361 * | 3/1998 | Horn et al. .......................... 521/137 |
| 6,042,749 * | 3/2000 | Kitamura et al. .................... 252/364 |

FOREIGN PATENT DOCUMENTS 2544560   4/1977   (DE) .

* cited by examiner

Primary Examiner—John M. Cooney, Jr.
(74) Attorney, Agent, or Firm—Joseph C. Gil; N. Denise Brown

(57) ABSTRACT

The invention provides a process for preparing flexible to semi-rigid polyurethane moulded items with compacted edge zones with given hardness and a much more flexible cellular core, so-called integral foams, in which physical blowing agents from the set comprising $C_6$ hydrocarbons are used.

7 Claims, No Drawings

METHOD FOR PRODUCING SOFT TO MEDIUM-HARD STRUCTURAL POLYURETHANE FOAMS

The invention provides a process for preparing flexible to semi-rigid polyurethane materials with compacted edge zones with a given degree of hardness and a much more flexible cellular core, so-called integral foams, in which physical blowing agents from the set of $C_6$ hydrocarbons are used.

Until its ozone-damaging properties were recognised monochlorotrifluoromethane (R11) was almost exclusively used as a blowing agent for building up flexible to semi-rigid polyurethane moulded items with compacted edge zones and a cellular internal structure. Accompanying this finding a number of new fluorine-containing blowing gases of the hydrochlorofluorocarbons (HCFC) and hydrofluorocarbon (HFC) type were developed and tested. Initially, hydrocarbons were also used in these tests, as can be seen from a number of patents (DE-A 3 430 285, U.S. Pat. No. 3,178,490, U.S. 3,182,104, U.S. 4,065,410, DE-A 2,622,951, U.S. Pat. No. 3,931,106 and DE-A 2 544 560).

Since disclosure of the ozone-damaging behaviour of hydrofluorocarbons, there has been no lack of attempts to use other types of blowing agents to prepare cellular polyurethanes. Thus in EP-A 364 854, a process for preparing moulded items with a compacted edge zone and a cellular core, preferably soles for shoes, from starting materials known per se is described, but using low boiling aliphatic and/or cycloaliphatic hydrocarbons with 4 to 8 carbon atoms in the molecule. The following are mentioned, inter alia, as aliphatic or cycloaliphatic hydrocarbons: cyclobutane, cyclopentane cycloheptane, cyclooctane, butane, n- and i-pentane, n-and i-hexane, n- and i-heptane and n- and i-octane, preferably cyclohexane and i- and n-pentane.

The object of the invention was to develop a flexible integral foam with a recognisable integral structure which is identical to or similar to products blown using HFCs and HCFCs.

Surprisingly, it has now been found that integral foams can be obtained by using specific $C_6$ hydrocarbon mixtures as blowing agents, these having impact strengths and surface hardnesses which are similar to those of systems blown with R11 and R141b and which are much better than systems blown with n-pentane, cyclopentane, R22 or R134a.

The invention therefore provides a process for preparing flexible to semi-rigid polyurethane moulded items with a compacted edge zone and a flexible cellular core, which is characterised in that a) organic and/or modified organic polyisocyanates and/or polyisocyanate pre-polymers are reacted with b) at least one polyol component with an OH-value of 20 to 200 and a functionality of 2 to 6, preferably 2 to 3, c) optionally combined with a polyol component with an OH-value of 201 to 899 and a functionality of 2 to 3 and with d) at least one chain-lengthening component with an OH- or amine-value of 600 to 1850 and a functionality of 2 to 4 and with e) optional additives, activators and/or stabilisers known per se in the presence of water and in the presence of $C_6$ hydrocarbon mixtures including 2-methylpentane, 3-methylpentane, 2,3-dimethybutane and 2,2-dimethylbutane, with a boiling range of 55 to 65° C.

In the process according to the invention, it is important that the boiling point range of the $C_6$ hydrocarbon mixture is within the stated range, preferably within the range 58 to 63° C.

Obviously it is also possible to use $C_6$ hydrocarbons in the mixture which have a boiling point outside this range. The only critical factor is that the proportion of these $C_6$ hydrocarbons is chosen in such a way that the stated boiling range is obtained for the mixture. A $C_6$ hydrocarbon mixture consisting of 2-methylpentane, 3-methylpentane, 2,3-dimethylbutane and 2,2-dimethylbutane, wherein the amounts of hexanes used are within the following ranges: 45 to 65 wt. % of 2-methyl pentane, 15 to 30 wt. % of 3-methylpentane, 10 to 25 wt. % of 2,3-dimethylbutane and 0 to 10 wt. % of 2,2-dimethylbutane, the percentages adding up to 100 wt. %, is particularly suitable for a $C_6$ hydrocarbon mixture for the process according to the invention.

As mentioned previously, water may also be used as a blowing agent in the process according to the invention. The amount of water which is also included in polyurethane formulations is generally 0.05 to 0.6 parts by weight, preferably 0.1 to 0.4 parts by weight, with reference to 100 parts by weight of components b) and c) (polyol components). The amount of $C_6$ hydrocarbon mixture is 0.2 to 10 parts by weight, preferably 0.5 to 8 parts by weight, with reference to 100 parts by weight of components b), c), d) and e) or b) and d) or b), c) and d) or b), d) and e), depending on the particular composition of the reaction products.

The flexible to semi-rigid polyurethane foams with integral structures prepared according to the invention possess Shore A hardnesses between 60 and 90 in the edge zone and compressive strengths between 80 and 300 kPa at densities between 400 and 600 kg/m³.

The combination of high surface hardness (given as Shore A) and low compressive strength of the moulded items is of particular advantage in the process according to the invention as it indicates a recognisable integral structure.

This combination of properties is only obtained with the $C_6$ hydrocarbon mixtures according to the invention and with the halogenated hydrofluorocarbons R11 or R141b which can no longer be used for environmental reasons.

Suitable organic polyisocyanates (a) are aliphatic, cycloaliphatic, araliphatic and, preferably, aromatic polyfunctional isocyanates known per se, such as are mentioned for example in EP-A 364 854. Toluylene diisocyanates and the diphenylmethane diisocyanates, their modified products or the corresponding pre-polymers which may be modified by urethane, urea, biuret, allophanate, carbodiimide or uretdione groups are particularly suitable. Particular aromatic polyisocyanates which may be mentioned are 4,4-diphenymethane diisocyanate, mixtures of 2,4'- and/or 4,4'-diphenylmethane diisocyanate or crude MDI products and/or 2,4- and/or 2,6-toluylene diisocyanate and their mixtures.

Compounds which are suitable as polyol component (b) are those with an OH-value of preferably 20 to 200, in particular 20 to 50 and a functionality of preferably 2 to 3, wherein polyetherpolyols have a molecular weight of 2000 to 8000 and polyesterpolyols have a molecular weight of 2000 to 4000. Polyols with OH-value of 201 to 899 and a functionality of 2 to 3 may optionally also be used as polyol component (c). Particularly suitable polyols have proven to be compounds selected from the group of polyetherpolyols and polyesterpolyols, such as are obtained by the addition of alkylene oxides such as ethylene oxide and propylene oxide to polyfunctional starters such as ethylene glycol, propylene glycol, glycerine, trimethylolpropane, sorbitol and/or ethylenediamine or by condensation of dicarboxylic acids such as adipic acid, succinic acid, glutaric acid, suberic acid, sebacic acid, maleic acid, phthalic acid with mainly bifunctional hydroxy components such as ethylene glycol, propylene glycol built up from ethylene oxide and propylene oxide as well as glycerine, trimethylolpropane, ethylenediamine, propylene glycol, ethylene glycol, sorbitol and their mixtures as starters. Modified polyols such as those obtained by grafting polyols with styrene and/or acrylonitrile, as polyurea dispersions or as PIPA polyols, may also be used as polyol component (b).

Polyetherpolyols and polyesterpolyols may be used either individually or mixed with each other.

Compounds suitable for use as component (d) are in particular those with an OH- or amine-value of 600 to 1850 and a functionality between 2 and 4, in particular 2 and 3.

The following may be mentioned by way of example here: glycols such as ethylene glycol, 1,4-butanediol, glycerine, trimethylolpropane and their short chain alkoxylation-products as well as diethyltoluylene diamine isomers. The cross-linking component (chain-lengthening component) d) is used in amounts of 3 to 20 wt. %, with reference to the polyol component b) and c) (if present), wherein ethylene glycol and 1,4-butanediol, and diethyltoluylene diamine isomers as diamines are preferred.

Components specified under e) are understood to be the following: compounds containing tertiary amino groups such as 1,4-diazo-(2.2.2)-bicyclooctane and bis-(2-dimethyl-aminoethyl)-ether, as well as organometallic compounds such as dimethyltin dilaurate or dibutyltin dilaurate, also coloured pastes, anti-yellowing agents, fillers, flame retardants, internal mould-release agents and stabilisers such as are known from EP 0 364 854.

The amounts depend on the particular field of use and may be determined by means of preliminary trials.

Preparation of the moulded items according to the invention is already known to a person skilled in the art and will not be described in any more detail. Reference is again made to EP-A 364 854 in this connection.

Fields of application for moulded items according to the invention are for instance bicycle saddles, safety items in the internal compartment of motor vehicles (arm rests, head supports, steering wheel covers), motor cycle seats, arm rests for office furniture and treatment couches in the medical field.

Surprisingly, it has been shown when using the process according to the invention that the use of specific $C_6$ hydrocarbon mixtures with a boiling range of 55 to 65° C. has advantages with regard to blowing agent yields, surface hardness and compressive strength as compared with the use of, for example, cyclohexane which was mentioned as preferred in EP 364 854.

EXAMPLES

Description of Raw Materials

Polyol 1:

Polyetherpolyol with an OH-value of 29, prepared by addition of 80 wt. % of propylene oxide and 20 wt. % of ethylene to propylene glycol as a starter with mainly primary OH groups.

Polyol 2:

Polyetherpolyol with an OH-value of 28, prepared by addition of 80 wt. % of propylene oxide and 20 wt. % of ethylene oxide to trimethylolpropane as a starter with mainly primary OH groups, up to 20% grafted with styrene/acrylonitrile.

Polyol 3:

Polyetherpolyol with an OH-value of 35, prepared by addition of 87 wt. % of propylene oxide and 13 wt. % of ethylene oxide to trimethylolpropane as starter with mainly primary OH groups.

Polyisocyanate A

Polyisocyanate pre-polymer with an isocyanate content of 28% prepared by reacting a polyisocyanate mixture from the diphenylmethane series, which was obtained by phosgenation of an aniline/formaldehyde condensate and an isocyanate content of 30% with 80 wt. % of diisocyanatodiphenylmethane, and 20 wt. % of homologues with more aromatic rings, with a polyether of OH-value 500 based on propylene glycol as starter and propylene oxide.

Preparing Test Specimens

The raw material mixtures described below are introduced into a sheet mould heated to 40° C. and with the dimensions 190×155×20 mm in the manner conventionally used for mechanical processing of polyurethane, compacted to 600 kg/m³ and removed from the mould after 10 minutes. The temperature of the raw materials is 25° C.

| Polyol formulation A | |
|---|---|
| Polyol 1 | 40.0 parts by weight |
| Polyol 2 | 35.0 parts by weight |
| Polyol 3 | 30.0 parts by weight |
| Ethylene glycol | 9.0 parts by weight |
| Water | 0.1 parts by weight |
| Stabiliser SH 203 from OSi | 0.3 parts by weight |
| Activator DABCO 33 LV from Air Products | 0.35 parts by weight |
| Formulations for test specimens | |
| Polyol formulation A | 100 parts by weight |
| Blowing agent | X parts by weight (see table 1 for data on X) |
| Isocyanate A | 48 parts by weight |

TABLE 1

| Example number | Blowing agent | Parts by weight | Compressive strength [kPa] | Shore A | Correlation factor Compressive strength/ Shore A |
|---|---|---|---|---|---|
| 1 (Comp.) | R11 | 15 | 255 | 82 | 3.11 |
| 2 (Comp.) | R141b | 15 | 275 | 81 | 3.39 |
| 3 (Comp.) | R22 | 3 | 430 | 84 | 5.12 |
| 4 (Comp.) | R134a | 3 | 462 | 82 | 5.63 |
| 5 (Comp.) | n-pentane | 5 | 483 | 87 | 5.55 |
| 6 (Comp.) | cyclopentane | 6 | 437 | 81 | 5.39 |
| 7 (Comp.) | 2,2-dimethyl butane | 6 | 441 | 81 | 5.44 |

TABLE 1-continued

| Example number | Blowing agent | Parts by weight | Compressive strength [kPa] | Shore A | Correlation factor Compressive strength/ Shore A |
|---|---|---|---|---|---|
| 8 (Comp.) | 3-methylpentane | 9 | 283 | 81 | 3.45 |
| 9 (Comp.) | cyclohexane | 15 | 499 | 76 | 6.56 |
| 10 (Invention) | hexane isomers* | 7 | 270 | 82 | 3.29 |

* Mixture of
56 wt. % of 2-methylpentane
21 wt. % of 3-methylpentane
17 wt. % of 2,3-dimethylbutane
6 wt. % of 2,2-dimethylbutane
Boiling point about 61° C.

The characteristics of the integral foams are determined to a particular extent by the surface hardness (measured as Shore A hardness) and the compressive strength.

The highest possible surface hardness (high density in the edge region) associated with a low compressive strength as compared with the overall density is advantageous.

This combination of properties is, as shown in the comparison experiments, strongly dependent on the choice of blowing agent.

A correlation factor consisting of compressive strength and surface hardness is used as a yardstick for evaluating the integral structure.

The smaller the value of this correlation factor the better is the integral structure.

As shown in comparison experiments 1 to 10, only the samples with a specific mixture of isomers of hexane as blowing agent achieved a correlation factor which is comparable to those of systems blown with R11 and R141b.

Mixtures which have a boiling range between 55 and 65° C. are preferred; ie the proportion of 2,2dimethylbutane (boiling point 49.7° C.) is as small as possible (maximum about 10 wt. %).

Systems blown with n-pentane and cyclopentane could not produce the values obtained by systems consisting of mixtures of hexane.

The mixtures of hexanes according to the invention also demonstrates advantages as compared with 2,2-dimethylbutane and 3-methylpentane, when these are used as the only blowing agent. The poor blowing agent yield obtained with cyclohexane is particularly disadvantageous.

What is claimed is:

1. A process for preparing flexible to semi-rigid polyurethane molded articles with a compacted edge zone and a flexible cellular core, comprising reacting a) one or more organic and/or modified organic polyisocyanates and/or polyisocyanate pre-polymers with b) at least one polyol component with an OH-value of 20 to 200 and a functionality of 2 to 6, c) optionally, a polyol component with an OH-value of 201 to 899 and a functionality of 2 to 3 d) at least one chain-lengthening component with an OH- or amine-value of 600 to 1850 and a functionality of 2 to 4 and e) optional additives, activators and/or stabilizers in the presence of water and in the presence of $C_6$ hydrocarbon mixtures comprising 2-methylpentane, 3-methylpentane, 2,3-dimethylbutane and optionally 2,2-dimethylbutane, wherein said $C_6$ hydrocarbon mixtures have a boiling point in the range of 55 to 65° C.

2. The process of claim 1, wherein from 3 to 20 wt. % of chain-lengthening component d), based on the weight of polyol component b) and c), is present.

3. The process of claim 1, characterized in that glycols are used as chain-lengthener d).

4. The process of claim 1, characterized in that isomers of diethyltoluylene diamine are used as chain lengthener d).

5. The process of claim 1, characterized in that molded items with a density of 250 to 900 kg/m³ are obtained.

6. The process of claim 1, wherein said polyol component b) has a functionality of 2 to 3.

7. The process of claim 1, wherein said $C_6$ hydrocarbon mixtures have a boiling point in the range of 58 to 63° C.

* * * * *